(12) United States Patent
Tenorio

(10) Patent No.: US 7,660,741 B2
(45) Date of Patent: *Feb. 9, 2010

(54) SOURCING UNDER QUANTITY PRICING RULES

(75) Inventor: Manoel Tenorio, Brasilia (BR)

(73) Assignee: i2 Technologies US, Inc., Dallas, TX (US)

( * ) Notice: Subject to any disclaimer, the term of this patent is extended or adjusted under 35 U.S.C. 154(b) by 646 days.

This patent is subject to a terminal disclaimer.

(21) Appl. No.: 10/378,802

(22) Filed: Mar. 3, 2003

(65) Prior Publication Data

US 2003/0167215 A1    Sep. 4, 2003

Related U.S. Application Data

(60) Provisional application No. 60/361,640, filed on Mar. 4, 2002.

(51) Int. Cl.
*G06Q 30/00* (2006.01)

(52) U.S. Cl. ................ 705/26; 705/1; 705/27; 705/28

(58) Field of Classification Search .......... 705/26, 705/27, 28, 29, 37, 36 R, 1; 707/10
See application file for complete search history.

(56) References Cited

U.S. PATENT DOCUMENTS

| | | | |
|---|---|---|---|
| 5,608,621 A * | 3/1997 | Caveney et al. | 705/10 |
| 5,758,328 A * | 5/1998 | Giovannoli | 705/26 |
| 6,282,517 B1 * | 8/2001 | Wolfe et al. | 705/36 R |
| 6,356,909 B1 * | 3/2002 | Spencer | 707/10 |
| 6,397,197 B1 * | 5/2002 | Gindlesperger | 705/37 |
| 6,587,838 B1 * | 7/2003 | Esposito et al. | 705/26 |
| 6,631,356 B1 * | 10/2003 | Van Horn et al. | 705/26 |
| 6,980,966 B1 * | 12/2005 | Sobrado et al. | 705/26 |
| 7,124,107 B1 * | 10/2006 | Pishevar et al. | 705/37 |
| 2001/0051905 A1 * | 12/2001 | Lucas | 705/29 |
| 2002/0023042 A1 * | 2/2002 | Solomon | 705/37 |
| 2002/0198756 A1 * | 12/2002 | Ghaisas et al. | 705/8 |
| 2003/0023499 A1 * | 1/2003 | Das et al. | 705/26 |
| 2003/0033236 A1 * | 2/2003 | Davenport et al. | 705/37 |
| 2003/0144852 A1 * | 7/2003 | Eckert et al. | 705/1 |
| 2003/0144916 A1 * | 7/2003 | Mumm et al. | 705/26 |

* cited by examiner

*Primary Examiner*—Yogesh C Garg
(74) *Attorney, Agent, or Firm*—Booth Udall, PLC; Steven J. Laureanti

(57) ABSTRACT

A method for sourcing an item requirement includes receiving an item requirement that identifies an item and a quantity of the item that needs to be sourced from one or more suppliers. The method also includes determining one or more sourcing criteria that affect the sourcing of the item. The sourcing criteria include one or more quantity pricing rules that are associated with each of a number of suppliers and the quantity of the item available at each of the suppliers. Furthermore, the method includes determining one or more suppliers from which the item should be sourced and a quantity of the item to obtain from each such supplier based on the sourcing criteria. In addition, the method includes automatically generating one or more transaction documents that each identify the item and the requested quantity of the item and that include a request that a supplier provide the requested quantity of the item. These transaction documents are communicated to the associated suppliers.

29 Claims, 5 Drawing Sheets

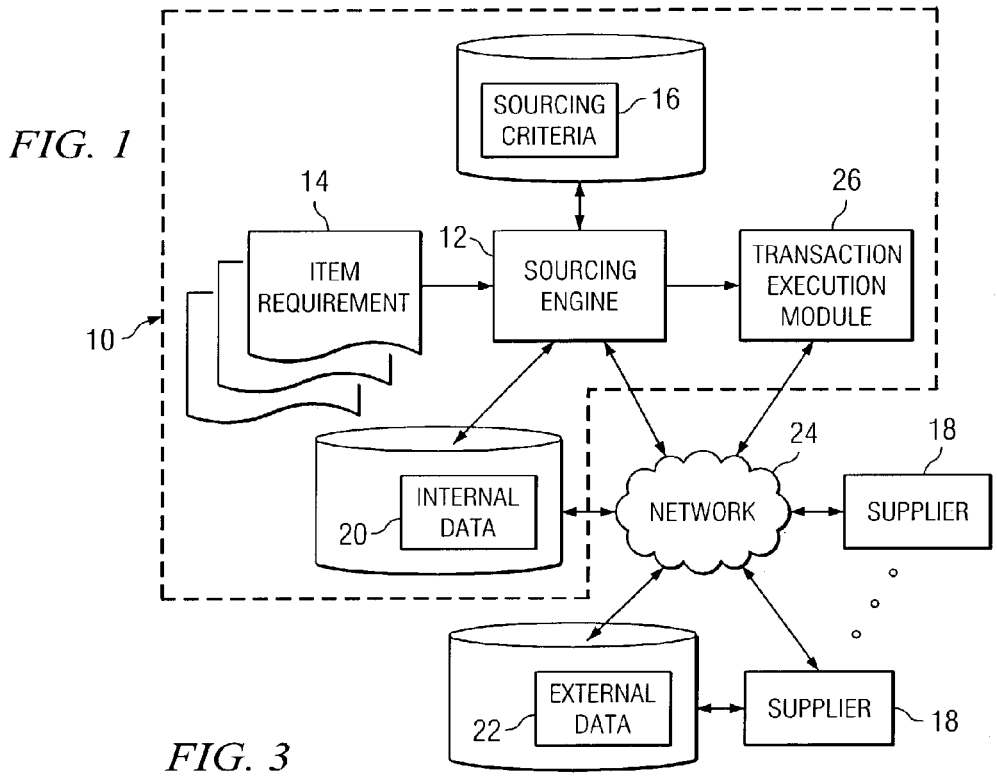
FIG. 1
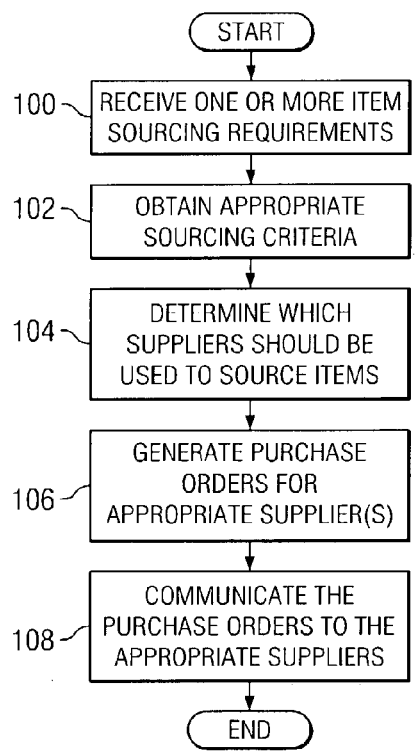
FIG. 3
FIG. 2
| QUANTITY PURCHASED | COMPANY A | COMPANY B | COMPANY C |
|---|---|---|---|
| 0-299 | 45 | 40 | 42 |
| 300-799 | 39 | 40 | 40 |
| 800-1999 | 36 | 37 | 38 |
| 2000-2999 | 33 | 30 | 33 |
| 3000-3999 | 30 | 28 | 29 |
| 4000- | 25 | 26 | 27 |

SOURCING UNDER QUANTITY PRICING RULES

RELATED APPLICATION

The Application claims the benefit under 35 U.S.C. § 119 of U.S. Provisional Application No. 60/361,640, filed Mar. 4, 2002.

TECHNICAL FIELD OF THE INVENTION

This invention relates to the field of sourcing of item requirements, and more particularly to sourcing under quantity pricing rules.

BACKGROUND OF THE INVENTION

Businesses and other entities typically acquire or "source" numerous products, parts, services, and other items from a variety of different suppliers or third parties. For example, an automobile company typically purchases tires from third party suppliers for use in manufacturing automobiles. In many cases, business requirements, contractual requirements, or other sourcing rules restrict the quantity or value of items that may be obtained from one or more suppliers. For example, a business may be contractually required to purchase a minimum number of items from a particular supplier or may have a business requirement that it should not purchase more than a certain value of items from any one supplier. Furthermore, the price that is charged by a supplier for a particular item may differ depending on the quantity of items that a business purchases. All of these various rules, requirements, and restrictions make it complicated for a business to determine the quantity of a particular item to buy from a number of potential suppliers to fulfill a needed quantity of that item. The complicated nature of such sourcing may lead to an inefficient and costly sourcing process.

SUMMARY OF THE INVENTION

According to the present invention, disadvantages and problems associated with previous sourcing techniques have been substantially reduced or eliminated.

According to one embodiment of the present invention, a method for sourcing an item requirement includes receiving an item requirement that identifies an item and a quantity of the item that needs to be sourced from one or more suppliers. The method also includes determining one or more sourcing criteria that affect the sourcing of the item. The sourcing criteria include one or more quantity pricing rules that are associated with each of a number of suppliers and the quantity of the item available at each of the suppliers. Furthermore, the method includes determining one or more suppliers from which the item should be sourced and a quantity of the item to obtain from each such supplier based on the sourcing criteria. In addition, the method includes automatically generating one or more transaction documents that each identify the item and the requested quantity of the item and that include a request that a supplier provide the requested quantity of the item. These transaction documents are communicated to the associated suppliers.

Particular embodiments of the present invention provide one or more technical advantages. For example, certain embodiments provide a system that automatically generates a preferred sourcing given multiple suppliers or sources, quantity pricing rules, and various other sourcing constraints or restrictions. This automatic generation of the sourcing eliminates the cost and inefficiency associated with previous techniques for determining a sourcing and also reduces the number of potential errors in the sourcing, such as the violation of a sourcing constraint or the selection of a sourcing that does not result in the lowest cost sourcing.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example sourcing system;
FIG. 2 illustrates an example quantity pricing table;
FIG. 3 illustrates an example method of sourcing.

DESCRIPTION OF EXAMPLE EMBODIMENTS

Figure 4A:
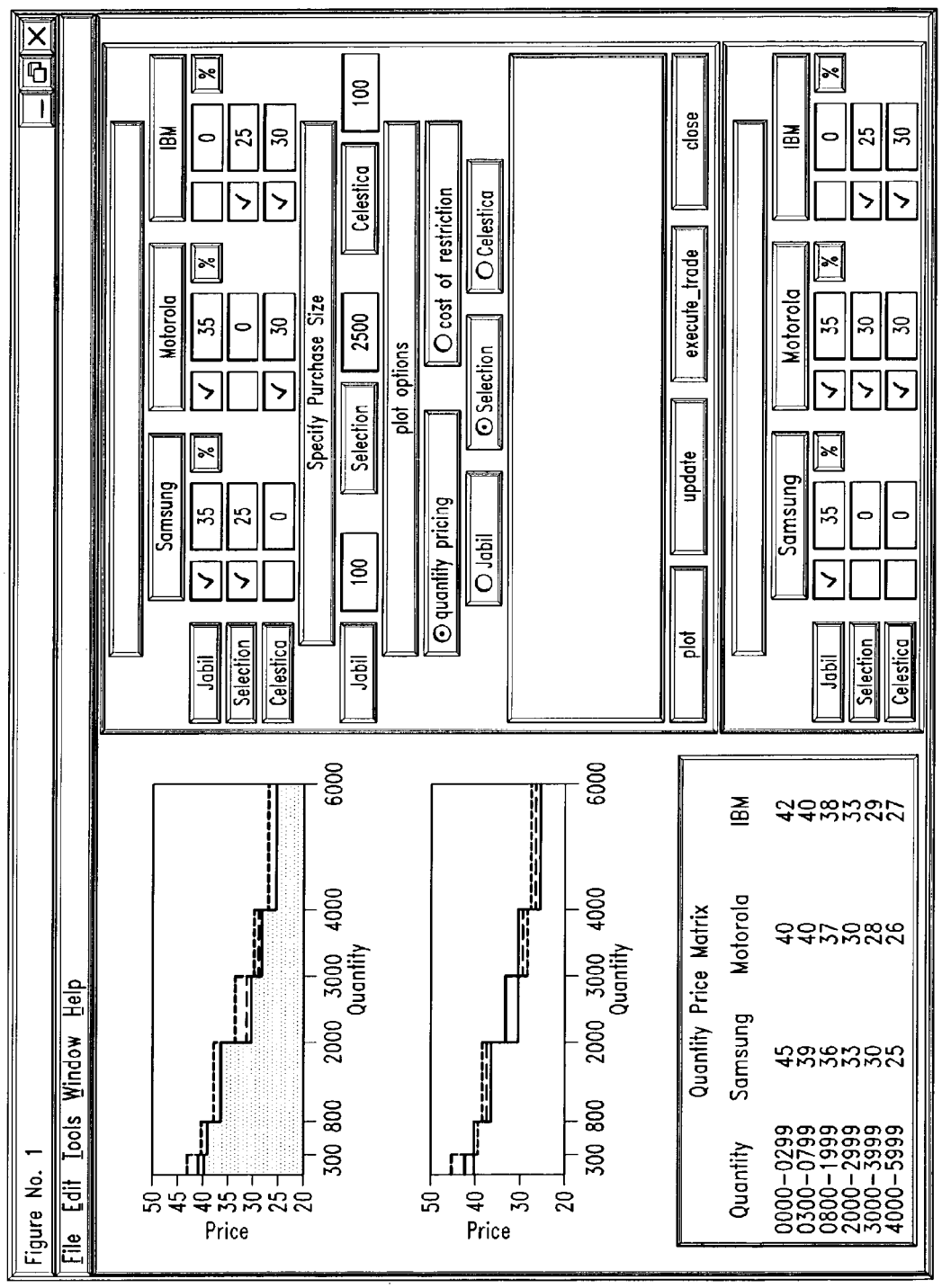
FIGS. 4A-4D illustrate example user interfaces that may be associated with a sourcing system.

FIG. 1 illustrates an example sourcing system 10. Businesses and other entities typically acquire or "source" a variety of items from numerous different suppliers or other third parties. The term "item" is meant to include goods (such as products or product parts), services, information, or any other suitable tangible or intangible things. As an example only, an automobile company may source tires from third party suppliers for use in manufacturing automobiles. The same company may also source services, such as catering or janitorial services. Although the example of an automobile manufacturer sourcing tires is used throughout this application, it will be understood that numerous other types of entities may source numerous other types of items and the present invention is in no way limited to this example.

There are typically a number of suppliers that available to provide a required item and many businesses, especially large businesses or businesses needing large quantities of a particular item, use multiple suppliers to provide an item. For example, the automobile supplier described above may obtain tires for its automobiles (even the same model of automobile) from multiple tire manufacturers. Such an arrangement may be used to meet inventory restrictions of suppliers (for example, a single supplier may not be able to provide the needed quantity of tires), to diversify risks associated with obtaining the tires (for example, the closure of a single supplier would not stop the flow of tires to the automobile company), to obtain particular business advantages (such a special contractual requirements with certain suppliers used to obtain better pricing or other advantages), or for any other appropriate reasons.

Assuming that a business sources a particular item from multiple suppliers, various factors affect what sourcing (for example, the quantity of the item to be supplied by each selected supplier) is optimal or preferred for a particular circumstance. These factors may include quantity pricing rules for each supplier, business requirements, contractual requirements, or other sourcing rules restricting the quantity or value of items that may be obtained from a supplier. For example, a business may be contractually required to purchase a minimum number of items from a particular supplier or may have a business requirement that it should not purchase more than a certain number or value of items from any one supplier. Furthermore, the price that is charged by a supplier for a particular item may differ depending on the quantity of items that a business purchases (quantity pricing rules). All of these various rules, requirements, and restrictions make it complicated for a business to determine the quantity of a particular item to buy from a number of potential suppliers to fulfill a needed quantity of that item. The complicated nature of such sourcing may lead to an inefficient and costly sourcing process.

System 10 provides an improved technique for sourcing items given quantity pricing rules and/or other restrictions. The components of system 10 allow sourcing requirements to be met so as to produce a sourcing that is optimal or preferred for a particular set of circumstances. The components of system 10 may be implemented as software and/or hardware associated with one or more computers in one or more locations. For example, system 10 may be associated with a particular business or may be implemented at an electronic marketplace or other networked electronic trading site. System 10 includes a sourcing engine 12 that receives one or more item sourcing requirements, analyzes item sourcing requirements 14, and sources the required items according to sourcing information, restrictions, and rules (collectively referred to as "sourcing criteria" 16) stored in one or more data storage locations. Sourcing criteria 16 may include information identifying approved suppliers 18, quantity pricing rules for suppliers 18, information regarding contractual or other business requirements associated with suppliers 18 that may affect the sourcing, various other sourcing rules, and any other appropriate criteria for use in sourcing BOMs 14. Further examples of sourcing rules may include a rule specifying that an item requirement should be sourced at the lowest cost, a rule specifying that a business should only buy a certain amount of items from a particular supplier 18, and/or a rule specifying that the number of suppliers 18 used to supply items should be minimized. Each such rule may be enforced with respect to the other rules. For example, some or all of the rules may be hard rules or constraints that may not be violated. Alternatively or in addition, some or all of the rules may be soft rules that may be violated. Such violations may incur penalties (possibly relative to the degree the rule is violated) that encourage the soft rules to be enforced, but that allow them to be violated if such a violation produces a sourcing that is optimal or preferred.

Sourcing criteria 16 may include information that is dynamically changed by suppliers 18 (such as price and available quantity information). This data may include internal data 20 stored in one or more data storage locations associated with system 10 and/or external data 22 stored in one or more data storage locations external to system 10. Suppliers 18 may communicate internal data 20 to system 10 on a periodic basis, as needed or requested by system 10, and/or in any other appropriate manner. Internal data 20 may be communicated to system 10 using a communication network 24. In an example embodiment, network 24 includes the Internet and any appropriate local area networks (LANs), metropolitan area networks (MANs), or wide area networks (WANs) coupling system 10 to suppliers 18. External data 22 may be maintained by suppliers 18 at one or more locations external to system 20 and made available to users using network 24 or in any other appropriate manner. System 10 may access external data 22 as needed or desired to make sourcing determinations. Although sourcing criteria 16 are illustrated as separate from internal data 20 and external data 22, it should be understood that sourcing criteria 16 may include (and typically do include) internal data 20 and/or external data 22 (with data 20 and 22 being specific types of sourcing criteria 16 that may be accessed and updated by suppliers 18).

System 10 also may include a transaction execution module 26 that can implement the sourcing decisions made by sourcing engine 12. Transaction execution module 26 may communicate purchase orders or other similar transaction documents to suppliers 18 using network 24 or other appropriate communication techniques. For example, the transaction documents may be communicated using electronic data interchange techniques, electronic mail, web-based communications (such as hypertext mark-up language or extensible mark-up language), or faxes. These transaction documents reflect the sourcing determinations made by sourcing engine 12. For example, transaction execution module 26 may communicate a purchase order to each supplier 18 that sourcing engine 12 determined was to be used to provide one or more items to meet a item sourcing requirement 14.

In operation, sourcing engine 12 receives an item requirement 14 that needs to be sourced, such as an identifier of the item and the needed quantity of the item. Sourcing engine 12 then accesses sourcing criteria 16 to determine the supplier or suppliers 18 that may be used to supply the item, supplier information associated with the item (such as pricing and availability), and rules and restrictions, such as quantity pricing rules, that are relevant to the sourcing determination. Sourcing engine 12 then uses this sourcing criteria 16 to make a sourcing determination. Any appropriate techniques may be used to determine the sourcing, including heuristic or linear programming algorithms. For example, the sourcing problem may be modeled as a constrained multi-source, multi-quantity pricing problem.

In particular circumstances, heuristic algorithms provide the fastest and most efficient method of determining an optimal or preferred sourcing given certain sourcing criteria 16. One example of such a heuristic algorithm is as follows. This example assumes that multiple suppliers may be used to meet an item sourcing need, that each supplier 18 has associated quantity pricing rules and quantities of the item available, and that one or more of the suppliers 18 has an associated minimum quantity of the needed item that must be obtained from the supplier (for example, due to contractual obligations of the business with the supplier). For purposes of the example, it is assumed that Company X (an automobile manufacturer) requires five thousand tires and that three different suppliers 18 (Company A, Company B, and Company C) are available to supply the needed tires. Company A and Company B both have associated required minimum quantities of five hundred tires each (so Company X must obtain five hundred tires from each). Furthermore, Company A has an available inventory of five hundred tires, Company B has an available inventory of two thousand tires, and Company C has an available inventory of three thousand tires. Moreover, each company has quantity pricing rules as described below.

FIG. 2 illustrates an example quantity pricing table 30 for these companies. Table 30 includes a set of per item prices 32 for each company. Each item price 32 is associated with a particular item quantity range 34. The price for an item from a particular company may be determined by identifying in table 30 the quantity of items that are to be purchased in a single transaction (or in an associated transaction) and then finding the associated price 32. For example, if nine hundred tires are purchased from Company B, the price per tire would be thirty-seven dollars. Alternatively, if only seven hundred tires are purchased from Company B, the price per tire would be forty dollars.

The example heuristic algorithm generates a sourcing solution by first fulfilling all the minimum quantity requirements. In this example, that includes obtaining at least five hundred tires from each of Company A and Company B. Therefore, after fulfilling the minimum quantity requirements, four thousand of the initial five thousand tires still need to be sourced. The next step performed by the example algorithm is to source as much of the remaining quantity as possible from the least expensive supplier. For a quantity of four thousand tires (plus the five hundred already committed), Company A has the lowest cost per item. However, Company A only has five hundred available tires (and those tires are already accounted for due to the minimum quantity requirement). Company B has fifteen hundred tires still remaining, and the cost for that quantity plus the five hundred already committed would be thirty dollars. Company C has three thousand tires available, and the cost for that quantity would be twenty-nine dollars. Therefore, the example algorithm would determine that three thousand tires should be sourced from Company C.

For the remaining required quantity of tires (one thousand tires), the last step is repeated such that the algorithm sources as much of the remaining quantity as possible from the least expensive supplier. Companies A and C have no more available tires, so the remaining tires would be sourced from Company B. The cost of these one thousand tires plus the five hundred tires already committed would be thirty-seven dollars. In summary, the example algorithm would source the five thousand tire requirement as follows: five hundred tires from Company A at thirty-nine dollars per tire, fifteen hundred tires from Company B at thirty-seven dollars per tire, and three thousand tires from Company C at twenty-nine dollars per tire. As can be seen, the minimum quantity requirements, the quantity pricing rules, and the available quantities all have an effect on the "preferred" sourcing. For example, without the minimum quantity requirements, no tires would have been sourced from Company A (since its lack of available tires caused its per tire price to increase).

It should be understood that although a particular algorithm and particular sourcing criteria 16 are described in the example above, sourcing system 10 may use any other appropriate techniques to source an item requirement 14 based on a variety of different sourcing criteria 16. For example, in addition to the sourcing criteria 16 provided in the example above,. there may be a restriction that no more than fifty percent of the order may be purchased from a single supplier 18. This would change the outcome above since more than fifty percent of the tires are being acquired from Company C. Any other appropriate restrictions or rules may also or alternatively be used. Furthermore, although sourcing for a single business is described, the above example and similar techniques may also apply to multiple companies that purchase items as a group to reduce costs (due to the quantity pricing rules).

FIG. 3 illustrates an example method of sourcing using system 10. The method begins at step 100 where sourcing engine 12 receives one or more item sourcing requirements 14 from an appropriate source. At step 102, sourcing engine 12 identifies the required item and obtains appropriate sourcing criteria 16 from one or more data storage locations. As described above, this sourcing criteria 16 may include one or more sourcing rules or restrictions, pricing data (for example, quantity pricing rules), and item availability information. At step 104, sourcing engine 12 uses these sourcing criteria 16 to determine which supplier or suppliers 18 should be used to obtain the required items. As described above, heuristic algorithms or any other appropriate techniques may be used in this determination. Transaction execution module 26 receives the sourcing determinations and generates purchase orders or other similar transaction documents at step 106 for the supplier(s) 18 that were determined to be used as a source for the item. The purchase orders or other documents may identify the required item, the needed quantity, and the quoted price (such as the price determined using the quantity pricing rules). At step 108, transaction execution module 26 uses network 24 or other appropriate communication resources to communicate the purchase orders to the appropriate suppliers 18, and the method ends.

Figure 4B:
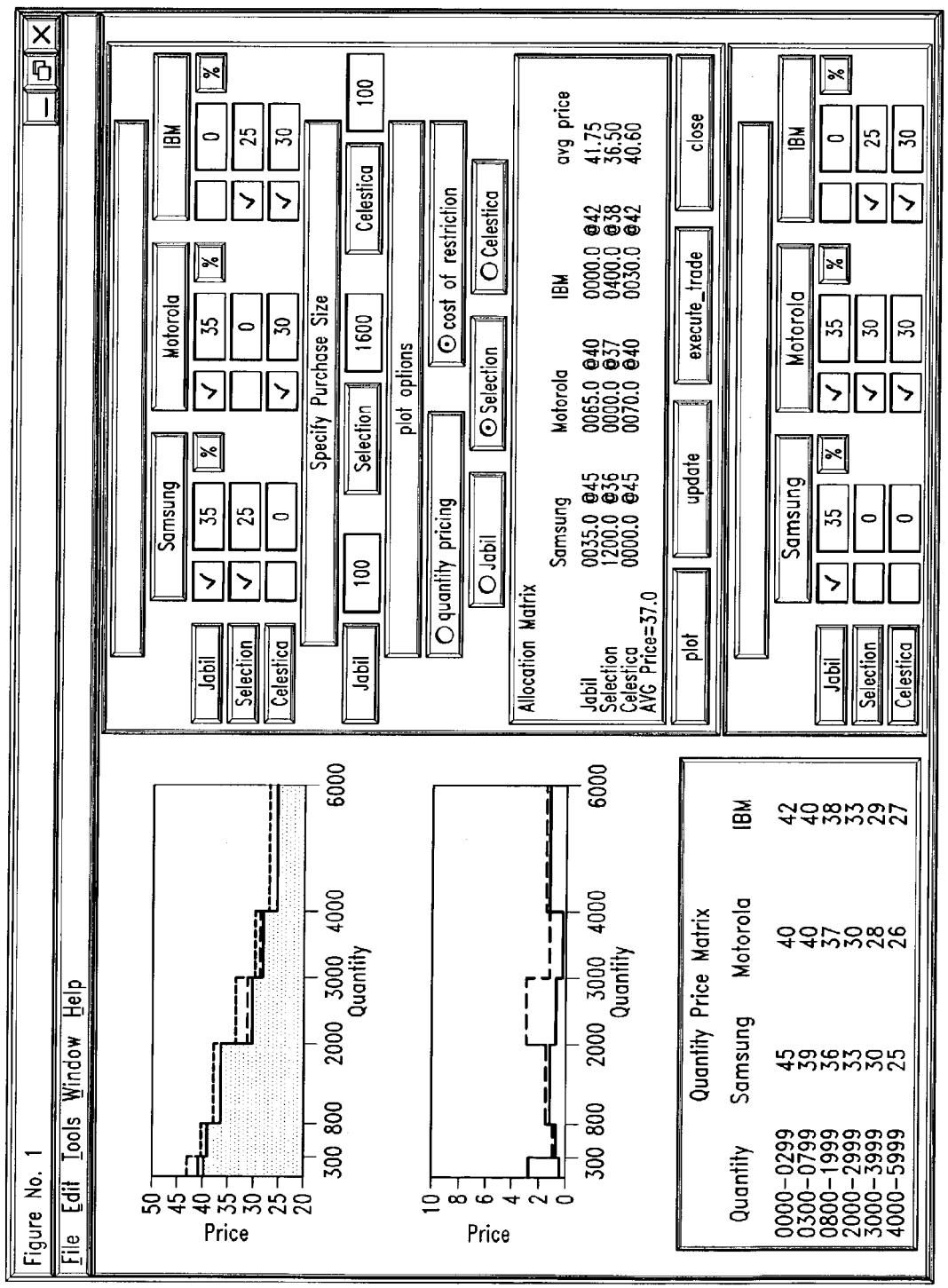
Figure 4C:
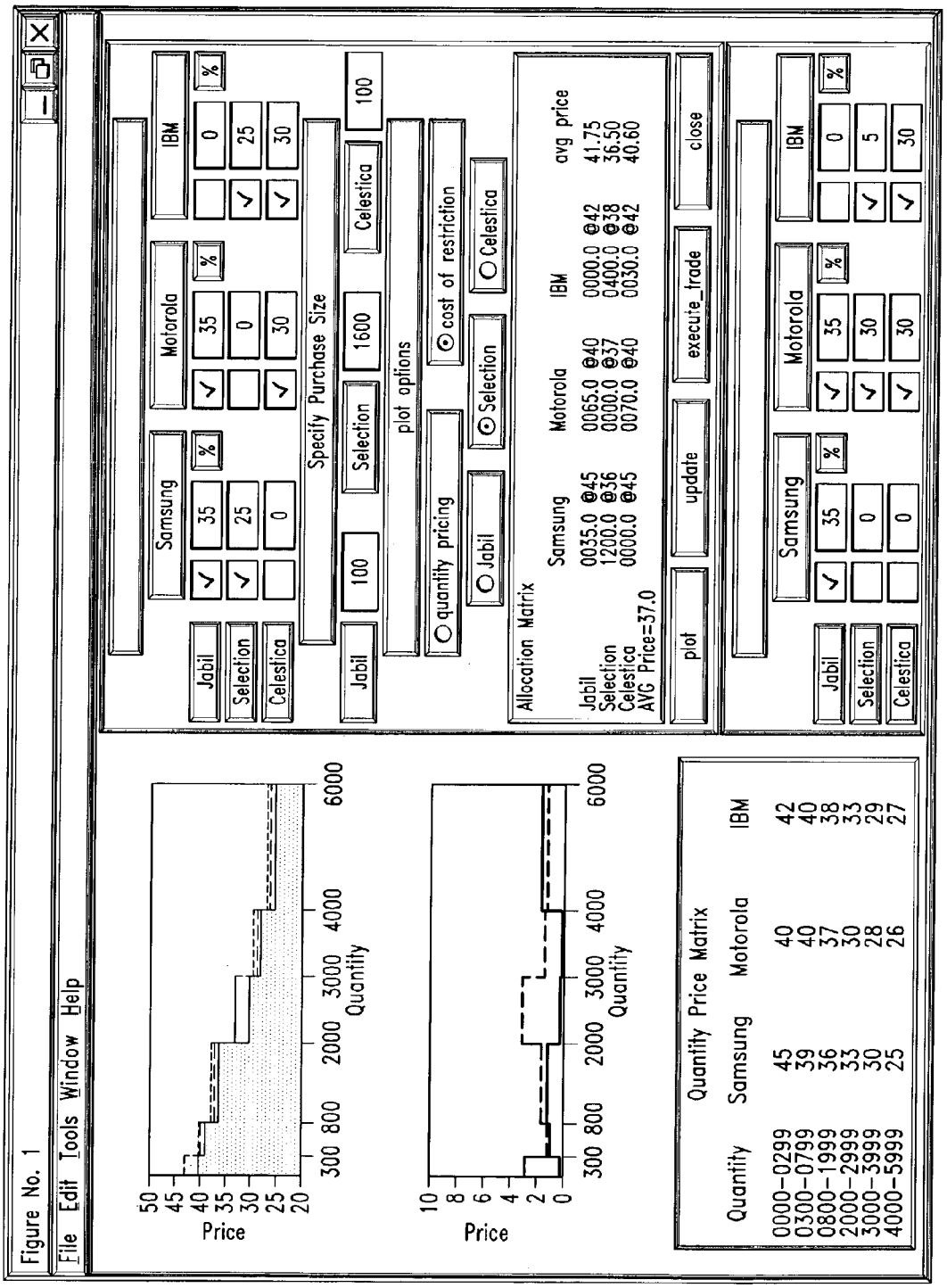
Figure 4D:
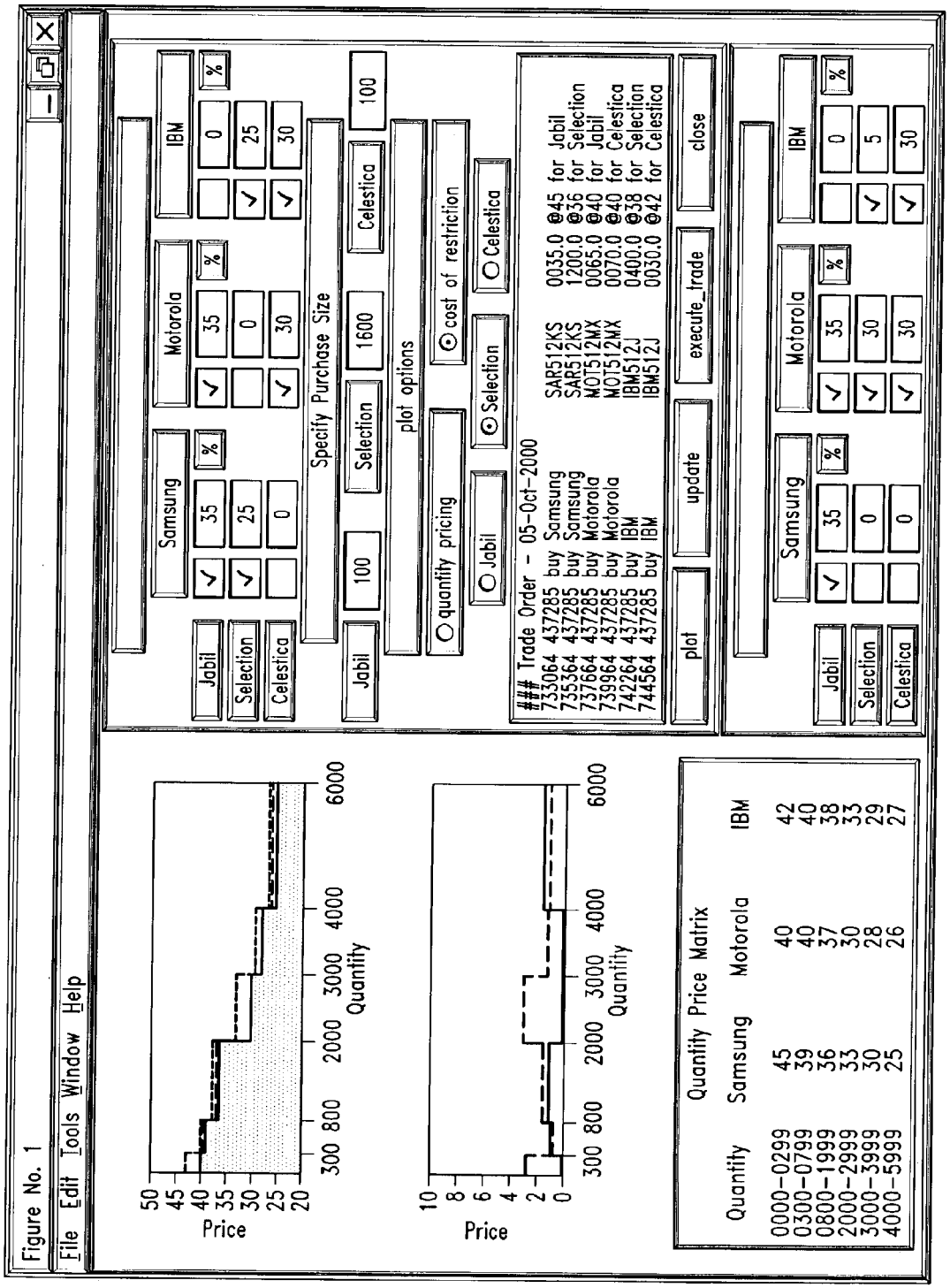

FIGS. 4A-4D illustrate example user interfaces that may be associated with sourcing system 10. These interfaces may be generated by sourcing system 10 and allow a user of system 10 to provide various information regarding a sourcing to be performed and may allow for the user to view output produced by sourcing system 10. For example, the interfaces may allow a user to enter appropriate suppliers of an item, one or more buyers of that item, percentage purchasing allocations for each supplier, quantities of the item required by the one or more buyers, and/or any other appropriate information. The interfaces may also display an appropriate quantity pricing matrix and one or more graphs that illustrate relevant quantity pricing rules and costs of restrictions (such as contractual restrictions requiring certain that quantities of an item be bought from a supplier regardless of cost). Moreover, the interfaces may also provide the user with an allocation matrix that identifies the quantity of the item to buy from each supplier and the costs associated with the items to be purchased from the various suppliers.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented sourcing system, comprising:
one or more data storage locations on a computer-readable medium comprising sourcing criteria;
a sourcing engine stored on a computer-readable medium and coupled with the one or more data storage locations, the sourcing engine configured to implement the following instructions when executed by a processor:
receive one or more item sourcing requirements, the one or more item sourcing requirements identify an item and a quantity of the item to be sourced from one or more suppliers;
access the sourcing criteria in the one or more data storage locations, the sourcing criteria comprising one or more quantity pricing rules associated with the one or more suppliers, the price and quantity information of the item available at each of the one or more suppliers, and two or more sourcing rules associated with the sourcing of the item, one of the two or more sourcing rules including a minimum sourcing requirement associated with one or more of the one or more suppliers, the two or more sourcing rules further comprising at least one hard sourcing rule and at least one soft sourcing rule, wherein the hard sourcing rule cannot be violated and the soft sourcing rule can be violated;
determine one or more suppliers from which the item should be sourced and a quantity of the item to obtain from each of the one or more suppliers based on the sourcing criteria; and
a transaction execution module on a computer-readable medium and coupled with the sourcing engine, the transaction execution module configured to implement the following instructions when executed by a processor:
receive the determination of the one or more suppliers;

generate one or more transaction documents each identifying the item and the requested quantity of the item, and including a request that a supplier provide the requested quantity of the item; and communicate the one or more transaction documents to the identified one or more suppliers.

2. The system of claim 1, wherein the sourcing criteria further comprise information identifying approved suppliers of the item, the suppliers used to supply the item being limited to the approved suppliers.

3. The system of claim 1, wherein the sourcing criteria further comprise contractual requirements with one or more suppliers that affect the sourcing of the one or more item sourcing requirements.

4. The system of claim 1, wherein the sourcing criteria further comprise a limit on the amount of parts that may obtained from a particular supplier.

5. The system of claim 1, wherein the one or more suppliers from which the item is sourced are determined using a heuristic algorithm, wherein each of the one or more suppliers has an associated minimum requirement of the item that must be obtained from the supplier.

6. The system of claim 1, wherein determining one or more suppliers from which the item should be sourced comprises:
fulfilling minimum sourcing requirements associated with one or more of the suppliers;
sourcing any remaining required item quantity from the least expensive supplier subject to the quantity of the item available from the least expensive supplier; and
repeating the previous act until all of the required item quantity is sourced.

7. The system of claim 1, wherein the one or more item requirements represent the combined item sourcing requirements of multiple entities.

8. The system of claim 1, wherein the transaction execution module is further configured to communicate the one or more transaction documents using a communication technique selected from the group consisting of electronic mail, fax, web-based communications, and electronic data interchange (EDI).

9. The system of claim 1, wherein the sourcing rules comprise rules selected from the group consisting of:
a rule specifying that the item requirement is sourced at the lowest cost;
a rule limiting the quantity of the item to be sourced from a particular supplier; and
a rule specifying that the number of suppliers for supplying the item should be minimized.

10. The system of claim 1, wherein the sourcing criteria further comprise one or more penalties to enforce the at least one soft sourcing rule, the one or more penalties can allow the at least one soft sourcing rule to be violated without a penalty, based on a sourcing determination.

11. A computer-implemented method of sourcing one or more item sourcing requirements comprising:
receiving, by a computer, one or more item sourcing requirements, the one or more item sourcing requirements identify an item and a quantity of the item that needs to be sourced from one or more suppliers;
accessing, by the computer, one or more sourcing criteria that affect the sourcing of the item, the sourcing criteria comprising one or more quantity pricing rules associated with the one or more suppliers, the price and quantity information of the item available at each of the one or more suppliers, wherein the price and quantity information is provided by the one or more suppliers, and two or more sourcing rules associated with the sourcing of the item, one of the two or more sourcing rules including a minimum sourcing requirement associated with one or more of the one or more suppliers, the two or more sourcing rules further comprising at least one hard sourcing rule and at least one soft sourcing rule, wherein the hard sourcing rule cannot be violated and the soft sourcing rule can be violated;

determining, by the computer, one or more suppliers from which the item should be sourced and a quantity of the item to obtain from each of the one or more suppliers based on the sourcing criteria;

automatically generating, by the computer, one or more transaction documents each identifying the item and the requested quantity of the item, and including a request that a supplier provide the requested quantity of the item; and communicating, by the computer, the one or more transaction documents to the identified one or more suppliers.

12. The method of claim 11, wherein the sourcing criteria further comprise information identifying approved suppliers of the item, the suppliers used to supply the item being limited to the approved suppliers.

13. The method of claim 11, wherein the sourcing criteria further comprise contractual requirements with one or more suppliers that affect the sourcing of the one or more item sourcing requirements.

14. The method of claim 11, wherein the sourcing criteria further comprise a limit on the amount of parts that may obtained from a particular supplier.

15. The method of claim 11, wherein the one or more suppliers from which the item is sourced are determined using a heuristic algorithm, wherein each of the one or more suppliers has an associated minimum requirement of the item that must be obtained from the supplier.

16. The method of claim 11, wherein determining one or more suppliers from which the item should be sourced comprises: fulfilling minimum sourcing requirements associated with one or more of the suppliers; sourcing any remaining required item quantity from the least expensive supplier subject to the quantity of the item available from the least expensive supplier; and repeating the previous act until all of the required item quantity is sourced.

17. The method of claim 11, wherein the one or more item sourcing requirements represent the combined item sourcing requirements of multiple entities.

18. The method of claim 11, wherein the transaction documents are communicated using a communication technique selected from the group consisting of electronic mail, fax, web-based communications, and electronic data interchange (EDI).

19. The method of claim 11, wherein the sourcing rules comprise rules selected from the group consisting of:
a rule specifying that the item requirement is sourced at the lowest cost;
a rule limiting the quantity of the item to be sourced from a particular supplier; and
a rule specifying that the number of suppliers for supplying the item should be minimized.

20. The method of claim 11, wherein the sourcing criteria further comprise one or more penalties to enforce the at least one soft sourcing rule, the one or more penalties can allow the at least one soft sourcing rule to be violated without a penalty, based on a sourcing determination.

21. A computer-readable medium storing a plurality of instructions that sources one or more item sourcing requirements, which, when executed by a processor, causes one or more computers to:

receive the one or more item sourcing requirements, the one or more item sourcing requirements identify an item and a quantity of the item to be sourced from one or more suppliers;

access one or more sourcing criteria that affect the sourcing of the item, the sourcing criteria comprising one or more quantity pricing rules associated with the one or more suppliers, the price and quantity information of the item available at each of the one or more suppliers, wherein the price and quantity information is provided by the one or more suppliers, and two or more sourcing rules associated with the sourcing of the item, one of the two or more sourcing rules including a minimum sourcing requirement associated with one or more of the one or more suppliers, the two or more sourcing rules further comprising at least one hard sourcing rule and at least one soft sourcing rule, wherein the hard sourcing rule cannot be violated and the soft sourcing rule can be violated;

determine one or more suppliers from which the item should be sourced and a quantity of the item to obtain from each of the one or more suppliers based on the sourcing criteria;

generate one or more transaction documents each identifying the item and the requested quantity of the item, and including a request that a supplier provide the requested quantity of the item; and communicate the one or more transaction documents to the identified one or more suppliers.

22. The software of claim 21, wherein the sourcing criteria further comprise information identifying approved suppliers of the item, the suppliers used to supply the item being limited to the approved suppliers.

23. The software of claim 21, wherein the sourcing criteria further comprise contractual requirements with one or more suppliers that affect the sourcing of the one or more item sourcing requirements.

24. The software of claim 21, wherein the sourcing criteria further comprise a limit on the amount of parts that may obtained from a particular supplier.

25. The software of claim 21, wherein the one or more suppliers from which the item is sourced are determined using a heuristic algorithm, wherein each of the one or more suppliers has an associated minimum requirement of the item that must be obtained from the supplier.

26. The software of claim 21, wherein determining one or more suppliers from which the item should be sourced comprises:

fulfilling minimum sourcing requirements associated with one or more of the suppliers;

sourcing any remaining required item quantity from the least expensive supplier subject to the quantity of the item available from the least expensive supplier; and repeating the previous act until all of the required item quantity is sourced.

27. The software of claim 21, wherein the one or more item sourcing requirements represent the combined item sourcing requirements of multiple entities.

28. The software of claim 21, wherein the sourcing rules comprise rules selected from the group consisting of:

a rule specifying that the item requirement is sourced at the lowest cost;

a rule limiting the quantity of the item to be sourced from a particular supplier; and a rule specifying that the number of suppliers for supplying the item should be minimized.

29. The software of claim 21, wherein the sourcing criteria further comprise one or more penalties to enforce the at least one soft sourcing rule, the one or more penalties can allow the at least one soft sourcing rule.

* * * * *

UNITED STATES PATENT AND TRADEMARK OFFICE
CERTIFICATE OF CORRECTION

PATENT NO.       : 7,660,741 B2                                   Page 1 of 1
APPLICATION NO.  : 10/378802
DATED            : February 9, 2010
INVENTOR(S)      : Manoel Tenorio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Thirtieth Day of November, 2010

David J. Kappos
*Director of the United States Patent and Trademark Office*